INVENTOR.
FREDERICK H. GREEN
BY
ATTORNEY

United States Patent Office 2,839,901
Patented June 24, 1958

2,839,901

EVAPORATIVE VORTEX TUBE REFRIGERATION SYSTEMS

Frederick H. Green, Los Angeles, Calif., assignor to The Garrett Corporation, Los Angeles, Calif., a corporation of California Application May 26, 1950, Serial No. 164,506

20 Claims. (Cl. 62—138)

My invention relates to a simple means for cooling gaseous fluids, which is particularly useful as a means for cooling air which is conducted to a space, the present invention being of especial value in aircraft because of the light weight and compact form thereof.

It is an object of the invention to provide a cooling device for gaseous fluids, which device has no moving parts, but uses vortex tube cooling means in combination with other parts so as to accomplish the desired cooling action with relatively light weight metal parts. The so-called vortex tube cooling means employed herein as an element of the new combination utilizes effects explained in U. S. Patent No. 1,952,281, granted March 27, 1934 to G. J. Ranque.

It is an object of the invention to provide a device wherein the gaseous fluid, under compression, is directed through an evaporative cooling means, so as to accomplish a preliminary reduction in the temperature of the gaseous fluid, and is then delivered to a vortex tube cooling means.

A further object of the invention is to provide a device wherein the gaseous fluid to be cooled, is conducted through a first cooling means and then through a second cooling means to a vortex tube cooling device, the second cooling means referred to herein being an evaporative cooler.

A further object of the invention is to provide a cooling device employing a vortex tube cooling means and an evaporative cooler disposed upstream from the vortex tube cooling means, this evaporative cooler being actuated by air which is discharged from the so-called "hot" end of the vortex tube.

A further object of the invention is to provide a cooling device wherein the coolant air discharged from the evaporative cooler is employed to cool the wall of the vortex tube.

A further object of the invention is to provide a vortex tube cooling device having several means for cooling different sections of the wall of the vortex tube by use of coolants of different temperatures derived from different coolant streams.

A further object of the invention is to provide a cooler employing a vortex tube wherein air is taken from an air outlet of the vortex tube, is cooled by evaporation of a liquid therein and is then brought into cooling relation to the tube wall of the vortex tube.

A further object of the invention is to provide a device for cooling gaseous fluid characterized by adjustability whereby air for actuating the evaporative cooler is selectively derived either from the outlet of the vortex tube or from the gaseous fluid duct upstream from the vortex tube.

Further objects and advantages of the invention will be brought out in the following part of the specification wherein I have described preferred embodiments of the invention in detail for the purpose of making a complete disclosure, without restricting the scope of the appended claims.

Referring to the drawings which are for illustrative purposes only:

Figure 1:
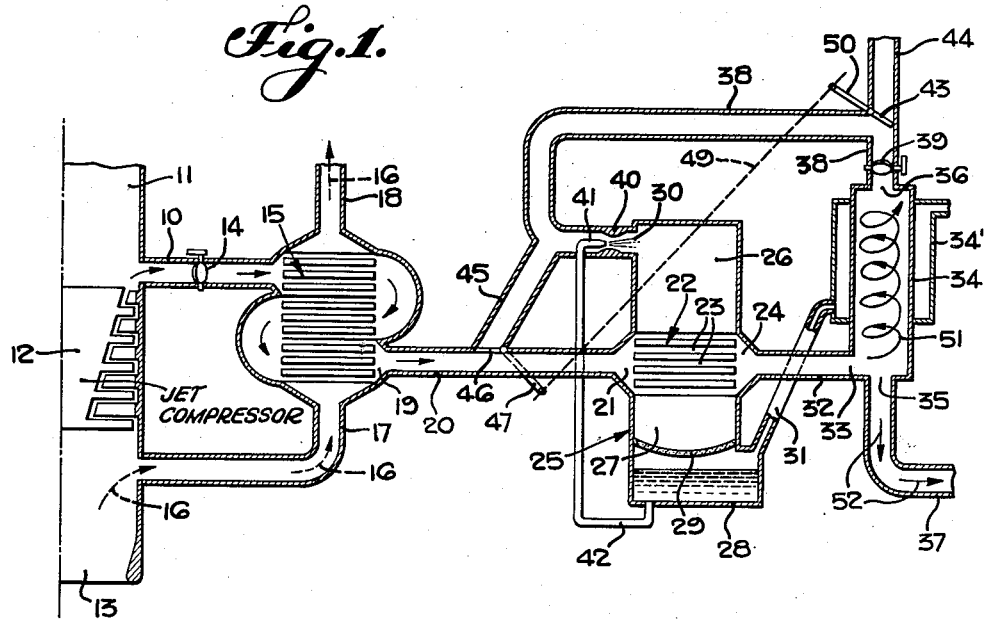
Fig. 1 is a schematic view of a preferred embodiment of the invention having a preliminary cooling unit employing a gaseous medium as a coolant.

Because of the utility of the invention as a means for cooling gaseous fluid in aircraft, I have in Fig. 1 disclosed a form of the invention for cooling a flow of gaseous medium consisting of air which is to be delivered to a selected space in an aircraft. In Fig. 1, I show a source of compressed air 10 consisting of an air take-off duct connected to the discharge 11 of a compressor 12 for supplying air to the jet propulsion means of an aircraft. This compressor 12 receives ambient air through a ram duct or inlet 13.

The duct 10 has therein a control valve 14 and leads to the inlet of a heat exchanger 15 which carries the compressed air in heat transfer relation to coolant air which is derived from the ram duct 13 ahead of the inlet of the compressor 12, as indicated by broken-line arrows 16, through a coolant air duct 17. The coolant air is discharged from the heat exchanger 15 through a coolant outlet 18. From the compressed air outlet 19 of the heat exchanger 15, the partly cooled compressed air is carried by a duct 20 to the compressed air inlet 21 of an evaporative cooler 22 comprising passages 23 for carrying the compressed air from the inlet 21 to the compressed air outlet 24. The air passages 23 extend across a housing 25 having an upper space 26 and a lower space 27 disposed above a water receptacle 28. Between the water receptacle 28 and the lower space 27 there is a grill or mesh 29 such as a glass fiber cloth or other fabric serving as a water separator. The housing 25 has an air inlet 30 at the upper end thereof and has an air outlet pipe 31 leading upward from the upper part of the water receptacle 28.

The air outlet pipe 31 conducts cooled air from the discharge of the evaporative cooler 22 to a cooling jacket 34' surrounding a selected quantity of the vortex tube 34, to bring the water cooled air into cooling relation to the wall of the vortex tube 34.

Cooled air from the outlet 24 of the evaporative cooler is conducted through a duct 32 to the tangential inlet nozzle 33 of a vortex tube 34 having a cooled air outlet 35 and a hot air outlet 36. From the cooled air outlet 35 a duct 37 is employed to carry the cooled air to the space which is to be cooled and/or pressurized thereby. A duct 38 having a valve 39 therein connects the hot air outlet 36 with the inlet 30 of the evaporative cooler housing 25. In the duct 38 adjacent the inlet 30 there is an aspirator 40 having a nozzle pipe 41 which is connected through piping 42 with the lower part of the water reservoir 28.

A valve 43, when opened, is adapted to connect the duct 38 with an outlet duct 44. A branch duct 45 leads from the duct 20 to the duct 38 upstream from the aspirator 40. This branch duct 45 is provided with a valve 46 having operating means such as a lever 47 for opening and closing the same. Under some circumstances a linkage 49 connects the lever 47 with a similar lever 50 associated with the valve 43 for correlating the opening and closing movements of the valves 43 and 46. With valves 14 and 39 opened and with valves 43 and 46 closed, the operation of the cooling device of Fig. 1 is as follows.

The heated, compressed air which is bled off from the discharge 11 of the compressor 12 is carried through the duct 10 and then through the heat exchanger 15 so as to be subjected to a preliminary cooling by coolant air indicated by arrows 16. The compressed air then passes through the compressed air passages 23 of the evaporative cooler 22 and, in further cooled condition, is delivered into the vortex tube 34 wherein it follows a spiral path somewhat as indicated by arrows 51. A portion of the compressed air which has been introduced into the vortex tube 34 moves axially and out through the cooled air outlet 35 as indicated by arrows 52, and is carried by the duct 37 to a selected space. The remaining portion of the air which has been introduced into the vortex tube through its inlet 33, passes through the outlet 36 and is carried by the duct 38 to the aspirator 40 and into the upper space 26 of the evaporative cooler 22. Water droplets from the water nozzle 41 are drawn by suction into the air stream which passes into the space 26 through the inlet 30, there being a reduction in temperature of the air and water droplets which move downwardly in the space 26 to the space 27 as the result of evaporation of a portion of the water which has been sprayed into the air stream by the aspirator 40. From the lower space 27 of the cooler 22 the air passes downwardly through the mesh or grill 29 and then out through the outlet 31. Water droplets and condensates, separated from the air flow by the water separating means 29, accumulate in the water reservoir 28 for recirculation through the piping 42.

A further cooling effect is obtained from the water sprayed from the nozzle 41 into the air which is entering the chamber 26 of the evaporative cooler 22 as previously explained herein, by bringing the water cooled air into engagement with at least a portion of the wall of the vortex tube 34. An example of one arrangement of the component parts of Fig. 1 is adapted to give the following results. Air taken through the duct 10 from the discharge 11 of the compressor 12 at a temperature of about 435° F. is reduced to 183° F. in passing through the heat exchanger 15. This compressed air is further reduced in temperature, by passing through the evaporative cooler 22 to about 137° F. and the portion of this air which is delivered from the vortex tube 34 to the delivery duct 37 is reduced in temperature by the vortex tube 34 to about 70° F. or less.

When the valves 43 and 46 are actuated air from the duct 20 will be conducted through the branch duct 45 and through the aspirator 40 into the upper part 26 of the evaporative cooler 22, and part or all of the air which moves outwardly through the hot air outlet 36 of the vortex tube 34 will pass off through the duct 44.

Figure 2:
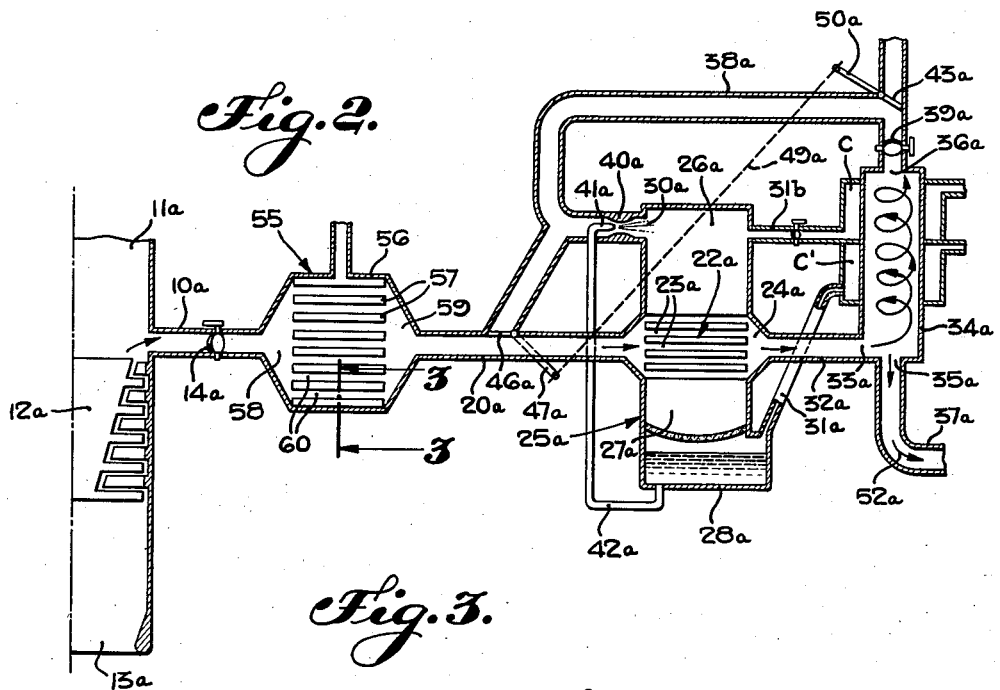
Fig. 2 is an embodiment of the invention similar to Fig. 1 but having a boiler type preliminary cooling element.
Figure 3:
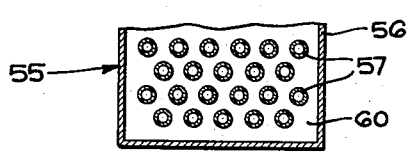
Fig. 3 is an enlarged fragmentary section taken as indicated at line 3—3 of Fig. 2.

The form of the invention disclosed in Figs. 2 and 3 is essentially the same as that shown in Fig. 1, with the exception that the heat exchanger 15 of Fig. 1 is replaced by a cooling device 55 which obtains its cooling effect by the boiling off of a liquid contained therein and a departure is made in the means for cooling the vortex tube 34a. Accordingly, equivalent parts in Fig. 2 are identified by numerals employed with relation to Fig. 1 having the character "a" affixed thereto. The boiler-type of cooler 55 comprises a shell 56 having tubes 57 connecting the compressed air inlet 58 with the compressed air outlet 59. The space 60 in the shell 56, between the tubes is vented and is filled with a liquid, for example water, which will be caused to boil by heat from the compressed air.

In the operation of the form of the invention shown in Fig. 2 the heated, compresed air passes through the duct 10a and the valve 14a to the inlet 58 of the primary cooling means 55. Heat from this compressed air is transmitted through the walls of the tubes 57 to the liquid in the shell 56 and this heat is carried off by boiling of the liquid, thereby producing a reduction in the temperature of the air which is delivered through the outlet 59 to the duct 20a which carries the compressed air to the inlet 21a of the evaporative cooler 22a. The compressed air is further cooled by passage through the passage 23a and is delivered in such further cooled condition by the outlet 24a of the cooler 22a to the duct 32a which delivers it to the compressed air inlet 33a of the vortex tube 34a. Cooled air is delivered from the cooled air outlet 35a of the vortex tube 34a to the delivery duct 37a as indicated by arrows 52a. Hot air is delivered through the outlet 36a and the valve 39a to the duct 38a which carries this hot air through the aspirator 40a to the inlet 30a of the upper space 26a of the evaporative cooler 22a. The passage of air through the aspirator 40a draws a spray of water from the nozzle 41a, such water being drawn through piping 42a from the water reservoir 28a disposed at the shell or housing 25a of the cooler 22a. Valve means 43a and 46a, with associated parts 47a, 49a and 50a are indicated so that the functions described thereto may be also had in the form of the invention shown in Fig. 2.

Different parts of the vortex tube, such as the tube 34a of Fig. 2, are heated to different temperatures. My present invention provides separate cooling means c and c' for separate portions of the wall of the vortex tube 34a. The cooling means c comprises a hollow jacket around one portion of the tube 34a through which moisture laden air is conducted from a chamber 26a through a valved duct 31b. The cooling means c' is also a hollow jacket around a portion of the vortex tube 34a, which is fed with water cooled air through the duct 31a leading from the upper part of the water receptacle 28a.

I claim:

1. In means for cooling a stream of gaseous fluid derived from a source of gaseous fluid under pressure: a first cooling means comprising a heat exchanger adapted to pass the compressed fluid in heat exchange relation to other fluid; an evaporative cooler comprising walls forming first passages for the compressed fluid which has passed through said first cooling means and second passages for a coolant gaseous fluid in heat exchange relation to said first passages; a vortex tube having an inlet connected to the outlet of said first passages of said evaporative cooler, having a cooled fluid outlet for connection to a space to be cooled and having a hot fluid outlet connected to said second passages of said evaporative cooler so as to pass gaseous fluid therethrough; a source of evaporative liquid; and an aspirator arranged to be operated by gaseous fluid which is moving toward said second passages of said evaporative cooler and to introduce said evaporative liquid in finely divided condition into the coolant gaseous fluid which flows through said second passages of said evaporative cooler.

2. In means for cooling a stream of gaseous fluid derived from a source of gaseous fluid under pressure: a first cooling means comprising a heat exchanger adapted to pass the compressed fluid in heat exchange relation to other fluid; an evaporative cooler comprising walls forming first passages for the compressed fluid which has passed through said first cooling means and second passages in heat exchange relation to said first passages; a vortex tube having an inlet connected to the outlet of said first passages of said evaporative cooler, having a cooled fluid outlet for connection to a space to be cooled and having a hot fluid outlet connected to said second passages of said evaporative cooler so as to pass gaseous fluid therethrough; and means adapted to spray an evaporative liquid into the gaseous fluid which passes through said second passages of said evaporative cooler.

3. In means for cooling a stream of gaseous fluid derived from a source of gaseous fluid under pressure: a first cooling means comprising a heat exchanger adapted to pass the compressed fluid in heat exchange relation to other fluid; an evaporative cooler comprising a shell defining a space, walls forming passages extending across said space, a receptacle for evaporative liquid communicating with the lower part of said space, a gaseous fluid outlet between said space and said receptacle and liquid separating means between said space and said outlet; a vortex tube having an inlet connected to the outlet of said passages of said evaporative cooler, having a cooled fluid outlet for connection to a space to be cooled and having a hot fluid outlet connected to the upper part of said space of said evaporative cooler so as to pass gaseous fluid therethrough; and an aspirator arranged to be operated by gaseous fluid which is moving toward said space of said evaporative cooler and to spray said evaporative liquid into the gaseous fluid which flows through said space of said evaporative cooler.

4. In means for cooling a stream of gaseous fluid derived from a source of gaseous fluid under pressure: a first cooling means comprising a heat exchanger adapted to pass the compressed fluid in heat exchange relation to other fluid; an evaporative cooler comprising a shell defining a space, walls forming passages extending across said space, a receptacle for evaporative liquid communicating with the lower part of said space, a gaseous fluid outlet between said space and said receptacle and liquid separating means between said space and said outlet; a vortex tube having an inlet connected to the outlet of said passages of said evaporative cooler, having a cooled fluid outlet for connection to a space to be cooled and having a hot fluid outlet connected to the upper part of said space of said evaporative cooler so as to pass gaseous fluid therethrough; and means adapted to spray evaporative liquid from said recptacle into the gaseous fluid which moves through said space of said evaporative cooler.

5. In means for cooling a stream of gaseous fluid derived from a source of gaseous fluid under pressure: a first cooling means comprising a heat exchanger adapted to pass the compressed fluid in heat exchange relation to a body of water so that said water will boil and thereby extract heat from the gaseous fluid; an evaporative cooler comprising walls forming first passages for the compressed fluid which has passed through said first cooling means and second passages in heat exchange relation to said first passages; a vortex tube having an inlet connected to the outlet of said first passages of said evaporative cooler, having a cooled fluid outlet for connection to a space to be cooled and having a hot fluid outlet connected to said second passages of said evaporative cooler so as to pass gaseous fluid therethrough; a source of evaporative liquid; and an aspirator arranged to be operated by gaseous fluid which is moving toward said second passages of said evaporative cooler and to spray said evaporative liquid into the gaseous fluid which flows through said second passages of said evaporative cooler.

6. In means for cooling air in an aircraft having an air compressor and a ram air inlet: a first cooling means comprising a heat exchanger adapted to pass compressed air from said compressor in heat exchange relation to air derived from said ram air inlet; an evaporative cooler comprising walls forming first passages for the compressed air which has passed through said first cooling means and second passages in heat exchange relation to said first passages; a vortex tube having an inlet connected to the outlet of said first passages of said evaporative cooler, having a cooled air outlet for connection to a space to be cooled and having a hot air outlet connected to said second passages of said evaporative cooler so as to pass air therethrough; a source of evaporative liquid; and an aspirator arranged to be operated by air which is moving toward said second passages of said evaporative cooler and to spray said evaporative liquid into the air which flows through said second passages of said evaporative cooler.

7. In means for cooling air in an aircraft having an air compressor and a ram air inlet: a first cooling means comprising a heat exchanger adapted to pass compressed air from said compressor in heat exchange relation to air derived from said ram air inlet; an evaporative cooler comprising walls forming first passages for the compressed air which has passed through said first cooling means and second passages in heat exchange relation to said first passages; a vortex tube having an inlet connected to the outlet of said first passages of said evaporative cooler, having a cooled air outlet for connection to a space to be cooled and having a hot air outlet connected to said second passages of said evaporative cooler so as to pass air therethrough; and means adapted to spray water into the air which passes through said second passages of said evaporative cooler.

8. In means for cooling air in an aircraft having an air compressor and a ram air inlet: a first cooling means comprising a heat exchanger adapted to pass compressed air from said compressor in heat exchange relation to air derived from said ram air inlet; an evaporative cooler comprising a shell defining a space, walls forming passages extending across said space, a receptacle for evaporative liquid communicating with the lower part of said space, an air outlet between said space and said receptacle and liquid separating means between said space and said outlet; a vortex tube having an inlet connected to the outlet of said passages of said evaporative cooler, having a cooled air outlet for connection to a space to be cooled and having a hot air outlet connected to the upper part of said space of said evaporative cooler so as to pass air therethrough; and an aspirator arranged to be operated by air which is moving toward said space of said evaporative cooler and to spray said evaporative liquid into the air which flows through said space of said evaporative cooler.

9. In means for cooling air in an aircraft having an air compressor, an evaporative cooler comprising a shell defining a space for a flow of coolant air, walls forming passages extending across said space, a receptacle for water communicating with the lower part of said space, an air outlet between said space and said receptacle and water separating means between said space and said outlet; a vortex tube having an inlet connected to the outlet of said passages of said evaporative cooler and having a cooled air outlet for connection to a space to be cooled; means adapted to spray water from said receptacle into the coolant air which moves through said space of said evaporative cooler and means adapted to apply a coolant to the exterior of the wall of said vortex tube.

10. In means for cooling air in an aircraft having an air compressor: a first cooling means comprising a heat exchanger adapted to pass compressed air from said compressor in heat exchange relation to a body of water so that said water will boil and thereby extract heat from the gaseous fluid; an evaporative cooler comprising walls forming first passages for the compressed air which has passed through said first cooling means and second passages in heat exchange relation to said first passages; a vortex tube having an inlet connected to the outlet of said first passages of said evaporative cooler and having a cooled air outlet for connection to a space to be cooled; means for passing coolant air through said second passages of said evaporative cooler; and means adapted to spray water into the air which passes through said second passages of said evaporative cooler.

11. In means for cooling air in an aircraft having an air compressor and a ram air inlet: a first cooling means comprising a heat exchanger adapted to pass compressed air from said compressor in heat exchange relation to air derived from said ram air inlet; an evaporative cooler comprising a shell defining a space, walls forming passages extending across said space, a receptacle for evaporative liquid communicating with the lower part of said space, an air outlet between said space and said receptacle and liquid separating means between said space and said outlet; a vortex tube having an inlet connected to the outlet of said passages of said evaporative cooler and having a cooled air outlet for connection to a space to be cooled; means adapted to deliver a portion of the compressed air into said shell space; and an aspirator arranged to be operated by air which is moving toward said space of said evaporative cooler and to spray said evaporative liquid into the air which flows through said space of said evaporative cooler.

12. In means for cooling air in an aircraft having an air compressor and a ram air inlet: a first cooling means comprising a heat exchanger adapted to pass compressed air from said compressor in heat exchange relation to air derived from said ram air inlet; an evaporative cooler comprising a shell defining a space, walls forming passages extending across said space, a receptacle for evaporative liquid communicating with the lower part of said space, an air outlet between said space and said receptacle and liquid separating means between said space and said outlet; a vortex tube having an inlet connected to the outlet of said passages of said evaporative cooler and having a cooled air outlet for connection to a space to be cooled; means adapted to deliver a portion of the compressed air into said shell space selectively from said first cooling means and said vortex tube; and an aspirator arranged to spray said evaporative liquid into the air which flows through said space of said evaporative cooler.

13. In means for cooling a stream of gaseous fluid derived from a source of gaseous fluid under pressure: an evaporative cooler comprising walls forming first passages for the compressed fluid and spaces for holding a fluid in heat exchange relation to said first passages; a vortex tube having an inlet connected to the outlet ends of said first passages of said evaporative cooler and having a cooled fluid outlet for connection to a space to be cooled; and means adapted to bring an evaporative liquid in said spaces into heat exchange relation to the gaseous fluid which passes through said first passages of said evaporative cooler to the inlet of said vortex tube.

14. In means for cooling a stream of gaseous fluid derived from a source of gaseous fluid under pressure: an evaporative cooler comprising walls forming first passages arranged for connection to said source of gaseous fluid and second passages for a coolant gaseous fluid in heat exchange relation to said first passages; a vortex tube having an inlet connected to the outlet of said first passages of said evaporative cooler, having a cooled fluid outlet for connection to a space to be cooled and having a hot fluid outlet connected to said second passages of said evaporative cooler so as to pass gaseous fluid therethrough; means for feeding an evaporative substance into said second passages; and means for cooling said vortex tube.

15. In means for cooling a stream of gaseous fluid derived from a source of gaseous fluid under pressure: an evaporative cooler comprising walls forming first passages arranged for connection to said source of gaseous fluid and second passages in heat exchange relation to said first passages; a vortex tube having an inlet connected to the outlet of said first passages of said evaporative cooler, having a cooled fluid outlet for connection to a space to be cooled and having a hot fluid outlet connected to said second passages of said evaporative cooler so as to pass gaseous fluid therethrough; and means adapted to spray an evaporative liquid into the gaseous fluid which passes through said second passages of said evaporative cooler.

16. In means for cooling air in an aircraft having an air compressor: an evaporative cooler comprising walls forming first passages arranged for connection to said air compressor and second passages in heat exchange relation to said first passages; a vortex tube having an inlet connected to the outlet of said first passages of said evaporative cooler and having a cooled air outlet for connection to a space to be cooled; means for passing coolant air through said second passages of said evaporative cooler; and means adapted to spray water into the air which passes through said second passages of said evaporative cooler.

17. In means for cooling a stream of gaseous fluid derived from a source of gaseous fluid under pressure: an evaporative cooler comprising walls forming first passages arranged for connection to said source of gaseous fluid and second passages for a coolant gaseous fluid in heat exchange relation to said first passages; a vortex tube having an inlet connected to the outlet of said first passages of said evaporative cooler, having a cooled fluid outlet for connection to a space to be cooled and having a hot fluid outlet connected to said second passages of said evaporative cooler so as to pass gaseous fluid therethrough; a source of evaporative liquid; an aspirator arranged to be operated by gaseous fluid which is moving toward said second passages of said evaporative cooler and to introduce said evaporative liquid in finely divided condition into the coolant gaseous fluid which flows through said second passages of said evaporative cooler; and means adapted to pass a quantity of said coolant gaseous fluid cooled by said evaporative substance, in cooling relation to the wall of said vortex tube.

18. In means for cooling air in an aircraft having an air compressor: an evaporative cooler comprising walls forming first passages arranged for connection to said air compressor and second passages in heat exchange relation to said first passages; a vortex tube having an inlet connected to the outlet of said first passages of said evaporative cooler and having a cooled air outlet for connection to a space to be cooled; means for passing coolant air through said second passages of said evaporative cooler; means adapted to spray water into the air which passes through said second passages of said evaporative cooler; and means adapted to pass said coolant air from said second passages of said evaporative cooler in cooling relation to the wall of said vortex tube.

19. In a cooling device of the character descirbed, the combination of: a vortex tube consisting of a tube having at the front end thereof a tangential inlet and an axial outlet for the cooled gaseous medium; means adapted to pass through said vortex tube a gaseous medium to be cooled; means establishing a path of flow for a coolant in engagement with one portion of the wall of said vortex tube; and means establishing an evaporable coolant in engagement with another portion of the wall of said vortex tube.

20. In a cooling device of the character described, the combination of: a vortex tube comprising a tube having at the front end thereof a tangential inlet and an axial outlet for cooled gaseous fluid; a cooling means to cool a flow of gaseous fluid; means for passing the cooled gaseous fluid through said vortex tube; means for forming a path of flow for coolant from a source of such coolant to the exterior of the vortex tube to bring the coolant into heat-absorbing proximity to the wall of said tube; and means upstream in said path of flow for dispersing an evaporable liquid in said coolant which is flowing toward said tube.

References Cited in the file of this patent

UNITED STATES PATENTS

| | | |
|---|---|---|
| 1,812,339 | Horne et al. | June 30, 1931 |
| 1,952,281 | Ranque | Mar. 27, 1934 |
| 2,097,104 | Saha | Oct. 26, 1937 |
| 2,304,151 | Crawford | Dec. 8, 1942 |
| 2,477,932 | King | Aug. 2, 1949 |
| 2,485,590 | Green | Oct. 25, 1949 |
| 2,509,899 | Wood | May 30, 1950 |
| 2,522,787 | Hughes | Sept. 19, 1950 |
| 2,581,168 | Bramley | Jan. 1, 1952 |
| 2,586,002 | Carson et al. | Feb. 19, 1952 |
| 2,650,582 | Green | Sept. 1, 1953 |
| 2,720,091 | Schelp | Oct. 11, 1955 |

FOREIGN PATENTS

| | | |
|---|---|---|
| 605,691 | Germany | Nov. 16, 1934 |